(12) United States Patent
Krishna et al.

(10) Patent No.: US 10,540,108 B2
(45) Date of Patent: Jan. 21, 2020

(54) SYSTEMS AND METHODS FOR BOOTING FROM VIRTUAL VOLUME SPANNED ACROSS UNKNOWN NUMBER OF STORAGE DEVICES BY CONSTRUCTING A VIRTUAL LOGICAL UNIT BASED ON METADATA OF THE STORAGE RESOURCES AND BY RESPONDING TO I/O COMMANDS WITH DATA ASSOCIATED WITH A DUMMY LOGICAL UNIT

(71) Applicant: Dell Products L.P., Round Rock, TX (US)

(72) Inventors: Vemuri Sai Krishna, Bangalore (IN); Ragendra K. Mishra, Bangalore (IN); Abhijit Rajkumar Khande, Bangalore (IN)

(73) Assignee: Dell Products L.P., Round Rock, TX (US)

(*) Notice: Subject to any disclaimer, the term of this patent is extended or adjusted under 35 U.S.C. 154(b) by 21 days.

(21) Appl. No.: 15/972,136

(22) Filed: May 5, 2018

(65) Prior Publication Data
US 2019/0339890 A1 Nov. 7, 2019

(51) Int. Cl.
G06F 3/06 (2006.01)
G06F 13/42 (2006.01)
G06F 9/4401 (2018.01)

(52) U.S. Cl.
CPC .......... *G06F 3/0632* (2013.01); *G06F 3/0688* (2013.01); *G06F 9/4403* (2013.01); *G06F 13/4221* (2013.01)

(58) Field of Classification Search
CPC .. G06F 3/0632; G06F 9/4403; G06F 13/4221; G06F 3/0688
USPC ..... 711/100, 4, 111, 112, 114; 710/104, 313, 710/5; 713/2, 100
See application file for complete search history.

(56) References Cited

U.S. PATENT DOCUMENTS

| | | | | |
|---|---|---|---|---|
| 8,082,411 B1* | 12/2011 | Seetharam | ............ | G06F 3/0617 709/225 |
| 8,255,659 B1* | 8/2012 | Pattar | .................... | G06F 3/0607 711/114 |
| 2005/0204108 A1* | 9/2005 | Ofek | ................... | G06F 11/1458 711/162 |
| 2012/0216053 A1* | 8/2012 | Yamashima | .......... | G06F 9/5066 713/300 |
| 2015/0324127 A1* | 11/2015 | Kawano | ................ | G06F 3/0665 711/173 |

(Continued)

*Primary Examiner* — Hong C Kim
(74) *Attorney, Agent, or Firm* — Jackson Walker L.L.P.

(57) ABSTRACT

In accordance with embodiments of the present disclosure, an information handling system may include a processor and a plurality of physical storage resources communicatively coupled to the processor via a bus, the plurality of physical storage resources configured to, in order to facilitate booting from a virtual logical unit spanning the plurality of physical storage resources: (i) after enumeration of the plurality of physical storage resources, construct the virtual logical unit based on metadata of the plurality of physical storage resources; and (ii) prior to construction of the virtual logical unit, respond to input/output commands from an operating system of the information handling system with data associated with a dummy logical unit or with an indication that the dummy logical unit is busy.

18 Claims, 3 Drawing Sheets

(56) References Cited

U.S. PATENT DOCUMENTS

| | | | |
|---|---|---|---|
| 2016/0210057 A1* | 7/2016 | Khande | G06F 3/0689 |
| 2017/0269857 A1* | 9/2017 | Kundu | G06F 3/0619 |

* cited by examiner

SYSTEMS AND METHODS FOR BOOTING FROM VIRTUAL VOLUME SPANNED ACROSS UNKNOWN NUMBER OF STORAGE DEVICES BY CONSTRUCTING A VIRTUAL LOGICAL UNIT BASED ON METADATA OF THE STORAGE RESOURCES AND BY RESPONDING TO I/O COMMANDS WITH DATA ASSOCIATED WITH A DUMMY LOGICAL UNIT

TECHNICAL FIELD

The present disclosure relates in general to information handling systems, and more particularly to methods and systems for booting from a virtual storage volume spanned across an unknown number of storage devices, such as Peripheral Component Interconnect Express (PCIe) devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use peripheral devices including Peripheral Component Interconnect (PCI) and PCI Express (PCIe) devices for storage and/or other functionality. For example, Non-Volatile Memory Express (NVMe) storage devices may often be implemented as PCIe devices.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

In traditional approaches, a storage array is typically managed by a hardware storage controller that may interface with a RAID driver executing on top of an operating system of an information handling system. Because individual storage resources are controlled by a standalone storage controller, as storage resources are added and removed, the RAID may be maintained.

Typically, during boot of an operating system in an information handling system, all storage controllers and storage devices are discovered and then initialized. For example, in the Windows operating system, initialization of storage devices is performed by invoking the respective installed drivers (e.g., by storport or miniport) sequentially one after another. In Windows, initialization may comprise a three-step process involving PCI_Discovery (e.g., Find Adapter in Windows), PCI_Initialization (e.g., HwInitialization in windows), and Small Computer Systems Interface (SCSI) Discovery. For every storage Peripheral Component Interconnect (PCI) device, PCI_Initialization may be followed by SCSI discovery. The operating system may expect at least one SCSI device for it to continue. In case of a boot device, the operating system expects a boot device to be discovered. If no boot logical unit is discovered, an operating system may crash with an error of "no boot device found."

Booting may present a particular challenge when it is desired to boot an information handling system from a virtual logical unit spanned across a plurality of Peripheral Component Interconnect Express (PCIe) devices, as the boot logical unit may comprise the virtual logical unit formed from the plurality of PCIe devices. This may be a common scenario in the case of Non-Volatile Memory Express (NVMe) storage drives.

Such challenges may be addressed relatively easily in the case of hardware RAID as the logical unit may be completely virtualized from the host. However, the challenge becomes difficult to address in the case of software RAID (operating system (OS) RAID) as the virtual logical unit's individual physical storage devices may be visible to the host operating system. After each PCIe storage device discovery, an operating system may initiate SCSI discovery. However, the virtual logical unit may not be ready after the discovery of the PCIe devices and SCSI discovery would not be able to respond.

SUMMARY

In accordance with the teachings of the present disclosure, the disadvantages and problems associated with existing approaches to construe this virtual logical unit comprising PCIe devices may be reduced or eliminated.

In accordance with embodiments of the present disclosure, an information handling system may include a processor and a plurality of physical storage resources communicatively coupled to the processor via a bus, the plurality of physical storage resources configured to, in order to facilitate booting from a virtual logical unit spanning the plurality of physical storage resources: (i) after enumeration of the plurality of physical storage resources, construct the virtual logical unit based on metadata of the plurality of physical storage resources; and (ii) prior to construction of the virtual logical unit, respond to input/output commands from an operating system of the information handling system with data associated with a dummy logical unit or with an indication that the dummy logical unit is busy.

In accordance with embodiments of the present disclosure, a method may include, in an information handling system comprising a processor and a plurality of physical storage resources communicatively coupled to the processor via a bus, in order to facilitate booting from a virtual logical unit spanning the plurality of physical storage resources: (i) after enumeration of the plurality of physical storage resources, constructing the virtual logical unit based on metadata of the plurality of physical storage resources; and (ii) prior to construction of the virtual logical unit, responding to input/output commands from an operating system of the information handling system with data associated with a dummy logical unit or with an indication that the dummy logical unit is busy.

In accordance with embodiments of the present disclosure, an article of manufacture may include a non-transitory computer-readable medium and computer-executable instructions carried on the computer-readable medium, the instructions readable by a processor, the instructions, when read and executed, for causing the processor to, in an information handling system comprising a host processor and a plurality of physical storage resources communicatively coupled to the host processor via a bus, in order to facilitate booting from a virtual logical unit spanning the plurality of physical storage resources: (i) after enumeration of the plurality of physical storage resources, construct the virtual logical unit based on metadata of the plurality of physical storage resources; and (ii) prior to construction of the virtual logical unit, respond to input/output commands from an operating system of the information handling system with data associated with a dummy logical unit or with an indication that the dummy logical unit is busy.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
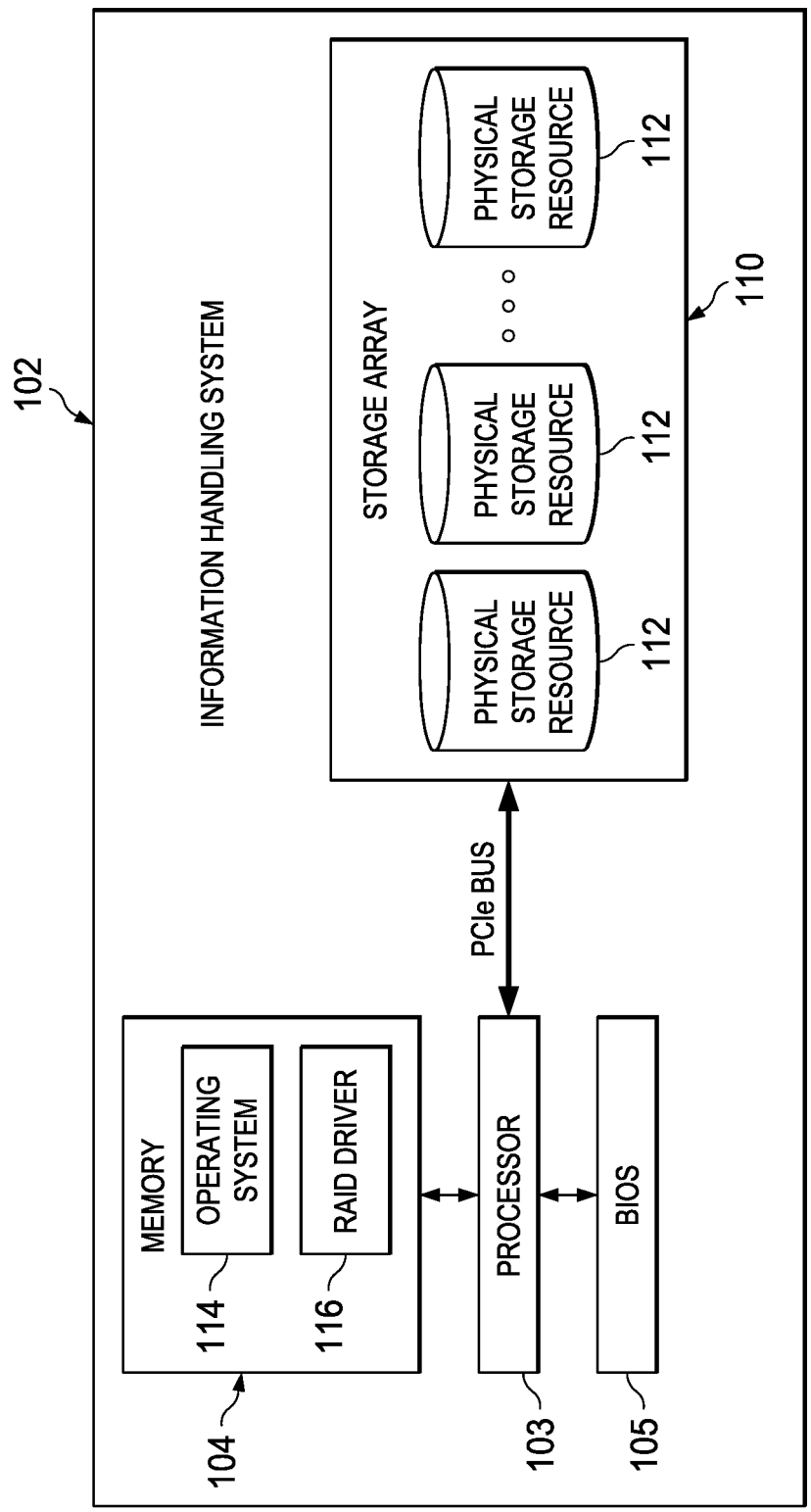
FIG. 1 illustrates a block diagram of an example information handling system, in accordance with embodiments of the present disclosure.
Figure 2:
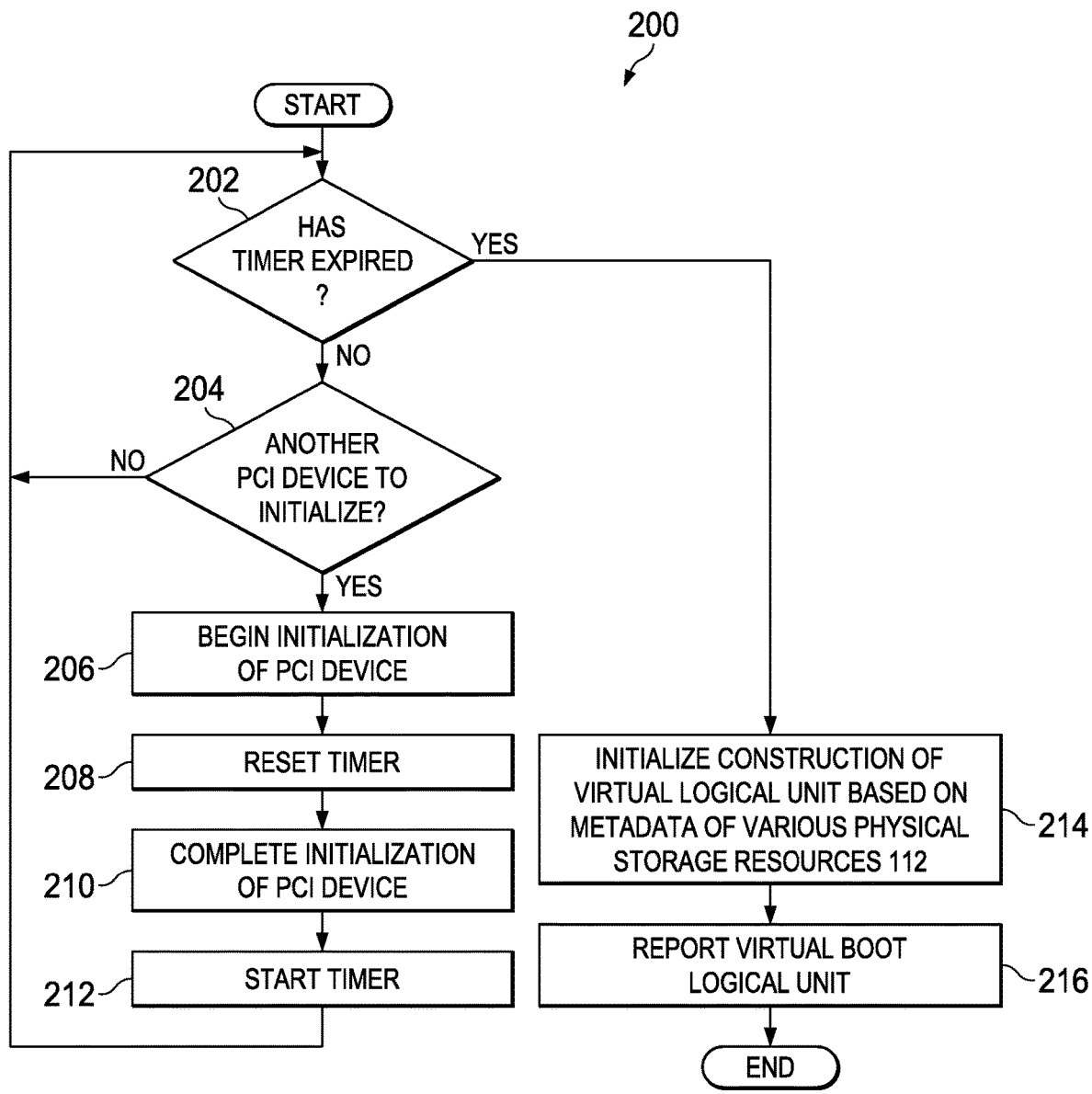
FIG. 2 illustrates a flow chart of an example method for booting from a virtual volume spanned across an unknown number of storage devices, in accordance with embodiments of the present disclosure.
Figure 3:
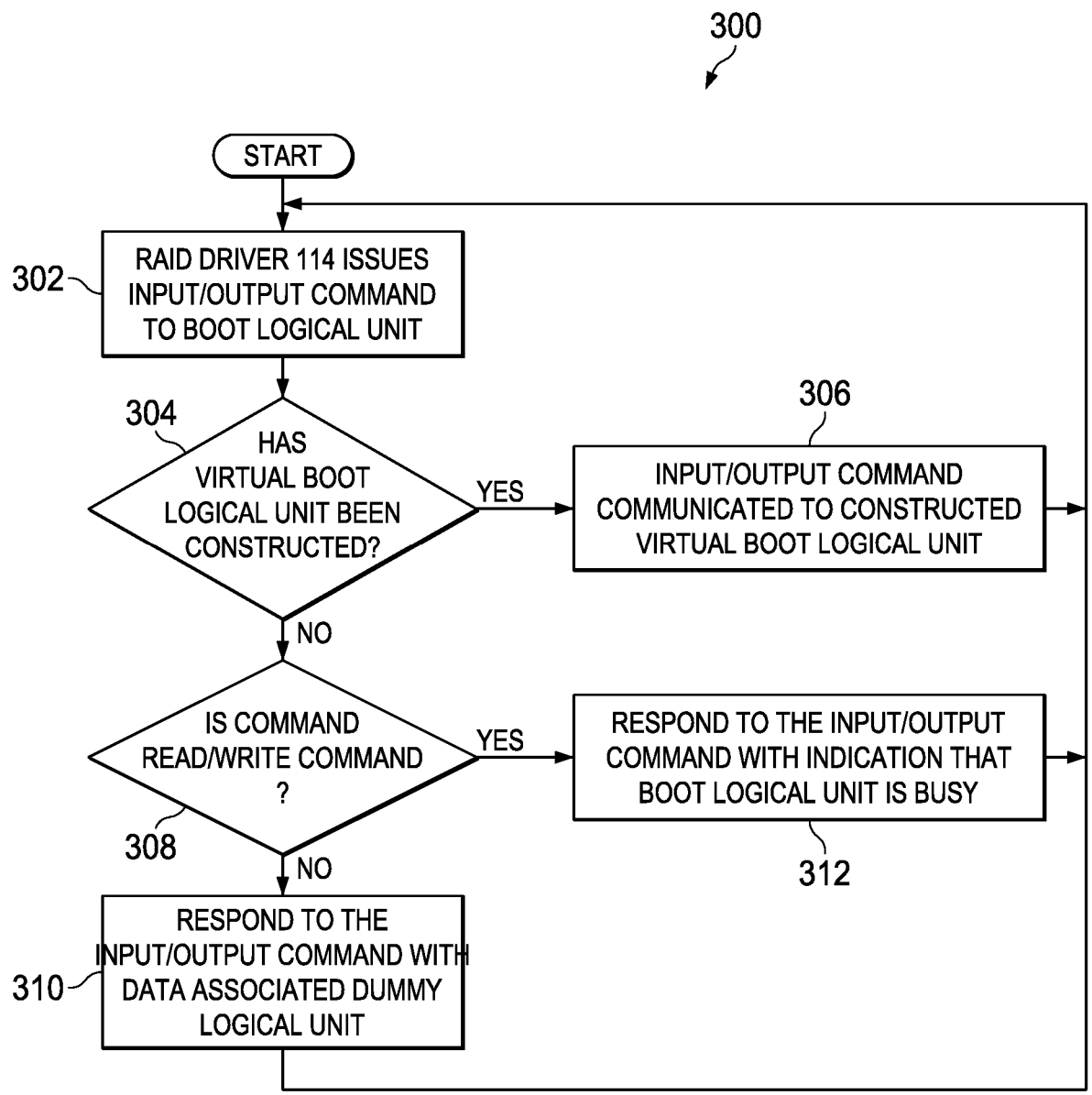
FIG. 3 illustrates a flow chart of an example method for keeping a logical unit discovery engine busy during construction of the logical unit, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an information handling system 102. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include processor 103, a memory 104 communicatively coupled to processor 103, a basic input/output system (BIOS) 105, and a storage array 110.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off. As shown in FIG. 1, memory 104 may have stored thereon an operating system (OS) 114, and a software RAID driver 116.

OS 114 may comprise any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 (e.g., from storage array 110) for execution by processor 103.

Software RAID driver 116 may comprise any program of instructions configured to, when read and executed by processor 103, provide an interface between OS 114 and hardware or firmware executing on one or more physical storage resources 112 of storage array 110, in order to control and manage RAID of physical storage resources 112 of storage array 110 and manage I/O between processor 103 and storage array 110.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Storage array 110 may include a plurality of physical storage resources 112. In some embodiments, storage array 110 may comprise a storage area network or "SAN." Although FIG. 1 depicts storage array 110 internal to information handling system 102, in some embodiments, storage array 110 may be external to information handling system 102 (e.g., coupled to information handling system 102 via a network or other wired connection).

Physical storage resources 112 may include one or more hard disk drives, magnetic tape libraries, optical disk drives, magneto-optical disk drives, compact disk drives, compact disk arrays, disk array controllers, and/or any other system, apparatus or device operable to store media. In operation, RAID driver 116 may configure one or more physical storage resources 112 to appear to an operating system or virtual machine executing on information handling system 102 as a single logical storage unit or virtual storage resource (which may also be referred to as a "LUN" or a "volume"). In particular embodiments, one or more physical storage resources 112 may comprise a PCIe device, such as an NVMe storage resource. In such embodiments, a PCIe controller may not be fixed in an information handling system chipset as are traditional storage controllers of traditional storage devices. Instead, PCIe controllers exist on the PCIe (e.g., NVMe storage devices themselves).

As shown in FIG. 1, a PCIe bus may couple processor 103 to storage array 110.

In operation, physical storage resources 112 may address the challenges discussed in the "Background" section above, as physical storage resources 112 may be configured to hold SCSI discovery from operating system 114 until all physical storage resources 112 are initialized and all SCSI discovery from RAID driver 116 to physical storage resources 112 is complete. In order to hold host SCSI discovery and complete all storage device initialization, it may be necessary to know the number of total PCI/PCIe devices present in information handling system 102. However, the total count of physical storage resources 112 present in information handling system 102 may not be directly used for boot, as third-party drivers may co-exist along with RAID driver 116 and such third-party drivers may claim some of the PCIe devices. As discussed in greater detail below, controllers of physical storage resources 112 may be configured to enable boot from a spanned RAID volume comprising a plurality of physical storage resources 112 without having to know the number of physical storage resources 112 to be claimed by RAID driver 116.

To enable such functionality, controllers of physical storage resources 112 may be configured to expose a dummy logical unit to operating system 114 during initialization of such controllers and then expose to operating system 114 the actual logical unit comprising a plurality of physical storage resources 112 after completion of all initialization. For the exposed dummy logical unit, controllers of physical storage resources 112 may be configured to pass all SCSI discover commands and respond as "busy" to all read/write SCSI commands, which keeps the logical unit discovery engine busy, such that operating system 114 does not give up on finding the boot logical unit spanned across physical storage resources 112.

Further, after the end of initialization of every controller of physical storage resources 112, the controllers may start a timer and wait for any new controller initialization call during duration of such timer. If the timer expires without receiving the next controller initialization call, controllers may start building logical units based on metadata of the various enumerated physical storage resources 112. On the other hand, if another controller initialization call is received prior to expiration of the timer, the timer resets and controllers may again wait for any new controller initialization call during duration of such timer.

In accordance with the foregoing functionality, RAID driver 116 may not need to reply on a count of the number of PCI/PCIe controllers present in information handling system 102, and can also co-exist along with other drivers that may claim such controllers.

FIG. 2 illustrates a flow chart of an example method 200 for booting from a virtual volume spanned across an unknown number of storage devices, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, controllers of PCI devices (e.g., physical storage resources 112 and/or other PCI devices) may determine if a timer has expired. If the timer has expired, method 200 may proceed to step 214. Otherwise, if the timer has not expired (or has yet to have been initialized and started, as may be the case if a PCI device has yet to be initialized), method 200 may proceed to step 204.

At step 204, the timer may wait for the initialization of another PCI device. If another PCI device is to be initialized, method 200 may proceed to step 206. Otherwise, method 200 may proceed again to step 202.

At step 206, a PCI device may begin initialization. At step 208, controllers of PCI devices may reset the timer. At step 210, the PCI device may complete its initialization. At step 212, the controllers of the PCI devices may start the timer for a predetermined duration. After step 212, method 200 may proceed again to step 202.

At step 214, responsive to the expiration of the timer, the controllers may initialize construction of a virtual logical unit based on metadata of the various physical storage resources 112. At step 216, after the virtual boot logical unit is constructed, the controllers may report (e.g., a PCIe bus) the virtual boot logical unit, and operating system 114 may issue input/output commands to the logical unit and boot. After completion of step 216, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

FIG. 3 illustrates a flow chart of an example method 300 for keeping a logical unit discovery engine busy during construction of the logical unit (e.g., during the contemporaneous execution of at least a portion of method 200), in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, RAID driver 116 may issue an input/output command to a boot logical unit. At step 304, controllers of storage resources 112 may determine if the virtual boot logical unit has been constructed (e.g., as occurs in step 214 of method 200). If the logical unit has been constructed, method 300 may proceed to step 306. Otherwise, method 300 may proceed to step 308.

At step 306, in response to determining the virtual boot logical unit has been constructed, the input/output command may be communicated to the constructed virtual boot logical unit. After completion of step 306, method 300 may return to step 302.

At step 308, in response to determining the virtual boot logical unit has not been constructed, controllers of physical storage resources 112 may determine if the input/output command is a read or write command. If the input/output command is a read or write command, method 300 may proceed to step 312. Otherwise, if the input/output command is not a read or write command, method 300 may proceed to step 310.

At step 310, the controllers may respond to the input/output command with data associated with a dummy logical unit. After completion of step 310, method 300 may proceed again to step 302.

At step 312, the controllers may respond to the read or write command with an indication that the boot logical unit (which may not yet actually exist) is busy. After completion of step 312, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor; and
a plurality of physical storage resources communicatively coupled to the processor via a bus, the plurality of physical storage resources configured to, in order to facilitate booting from a virtual logical unit spanning the plurality of physical storage resources:

after enumeration of the plurality of physical storage resources, construct the virtual logical unit based on metadata of the plurality of physical storage resources; and prior to construction of the virtual logical unit, respond to input/output commands from an operating system of the information handling system with data associated with a dummy logical unit or with an indication that the dummy logical unit is busy.

2. The information handling system of claim 1, wherein, during enumeration of the plurality of physical storage resources, the plurality of physical storage resources is configured to:

upon completion of initialization of one of the physical storage resources, begin a timer of predetermined duration;

reset the timer responsive to beginning of initialization of another one of the physical storage resources; and construct the virtual logical unit based on metadata of the plurality of physical storage resources responsive to expiration of the timer.

3. The information handling system of claim 1, wherein the plurality of physical storage resources are configured to respond to input/output commands other than a read command and a write command with data associated with the dummy logical unit.

4. The information handling system of claim 1, wherein the plurality of physical storage resources are configured to respond to input/output commands including a read command and a write command with the indication that the dummy logical unit is busy.

5. The information handling system of claim 1, wherein the bus is a Peripheral Component Interconnect Express bus.

6. The information handling system of claim 1, wherein the plurality of physical storage resources comprise Non-Volatile Memory Express devices.

7. A method comprising, in an information handling system comprising a processor and a plurality of physical storage resources communicatively coupled to the processor via a bus, in order to facilitate booting from a virtual logical unit spanning the plurality of physical storage resources:

after enumeration of the plurality of physical storage resources, constructing the virtual logical unit based on metadata of the plurality of physical storage resources; and prior to construction of the virtual logical unit, responding to input/output commands from an operating system of the information handling system with data associated with a dummy logical unit or with an indication that the dummy logical unit is busy.

8. The method of claim 7, further comprising, during enumeration of the plurality of storage resources:

upon completion of initialization of one of the physical storage resources, beginning a timer of predetermined duration;

resetting the timer responsive to beginning of initialization of another one of the physical storage resources; and constructing the virtual logical unit based on metadata of the plurality of storage resources responsive to expiration of the timer.

9. The method of claim 7, further comprising responding to input/output commands other than a read command and a write command with data associated with the dummy logical unit.

10. The method of claim 7, further comprising responding to input/output commands including a read command and a write command with the indication that the dummy logical unit is busy.

11. The method of claim 6, wherein the bus is a Peripheral Component Interconnect Express bus.

12. The method of claim 7, wherein the plurality of physical storage resources comprise Non-Volatile Memory Express devices.

13. An article of manufacture comprising:

a non-transitory computer-readable medium; and computer-executable instructions carried on the computer-readable medium, the instructions readable by a processor, the instructions, when read and executed, for causing the processor to, in an information handling system comprising a host processor and a plurality of physical storage resources communicatively coupled to the host processor via a bus, in order to facilitate booting from a virtual logical unit spanning the plurality of physical storage resources:

after enumeration of the plurality of physical storage resources, construct the virtual logical unit based on metadata of the plurality of physical storage resources; and prior to construction of the virtual logical unit, respond to input/output commands from an operating system of the information handling system with data associated with a dummy logical unit or with an indication that the dummy logical unit is busy.

14. The article of claim 13, the instructions for further causing the processor to, during enumeration of the plurality of storage resources:

upon completion of initialization of one of the physical storage resources, begin a timer of predetermined duration;

reset the timer responsive to beginning of initialization of another one of the physical storage resources; and construct the virtual logical unit based on metadata of the plurality of storage resources responsive to expiration of the timer.

15. The article of claim 13, the instructions for further causing the processor to respond to input/output commands other than a read command and a write command with data associated with the dummy logical unit.

16. The article of claim 8, the instructions for further causing the processor to respond to input/output commands including a read command and a write command with the indication that the dummy logical unit is busy.

17. The article of claim 13, wherein the bus is a Peripheral Component Interconnect Express bus.

18. The article of claim 13, wherein the plurality of physical storage resources comprise Non-Volatile Memory Express devices.

* * * * *